(12) United States Patent
Yumura et al.

(10) Patent No.: US 7,598,458 B2
(45) Date of Patent: Oct. 6, 2009

(54) SUPER-CONDUCTIVE CABLE

(75) Inventors: Hiroyasu Yumura, Osaka (JP);
Masanobu Nishimura, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/550,271

(22) PCT Filed: Sep. 9, 2004

(86) PCT No.: PCT/JP2004/013119

§ 371 (c)(1),
(2), (4) Date: Sep. 23, 2005

(87) PCT Pub. No.: WO2005/029509

PCT Pub. Date: Mar. 31, 2005

(65) Prior Publication Data

US 2006/0175078 A1    Aug. 10, 2006

(30) Foreign Application Priority Data

Sep. 24, 2003   (JP) .............................. 2003-332284

(51) Int. Cl.
*H01B 12/00* (2006.01)
(52) U.S. Cl. ..................................... 174/125.1; 505/230
(58) Field of Classification Search ................ 174/68.1, 174/98, 99 R, 125.1, 15.4, 15.5; 505/230–232
See application file for complete search history.

(56) References Cited

U.S. PATENT DOCUMENTS

| | | | |
|---|---|---|---|
| 3,595,982 A | | 7/1971 | Kafka |
| 3,612,742 A | * | 10/1971 | Snowden et al. ......... 174/125.1 |
| 5,932,523 A | | 8/1999 | Fujikami et al. |
| 6,262,375 B1 | * | 7/2001 | Engelhardt et al. ....... 174/125.1 |
| 6,596,945 B1 | * | 7/2003 | Hughey et al. ........... 174/125.1 |
| 6,849,580 B2 | * | 2/2005 | Norton et al. ............... 505/237 |
| 2002/0153162 A1 | * | 10/2002 | Spreafico ................. 174/125.1 |
| 2003/0000731 A1 | * | 1/2003 | Hughey et al. ........... 174/125.1 |

(Continued)

FOREIGN PATENT DOCUMENTS

JP        2000-067663        3/2000

(Continued)

OTHER PUBLICATIONS

The Big Chill, published in The New Scientist magazine, Oct. 13, 2001 by Paul Grant.*

(Continued)

*Primary Examiner*—Jeremy C Norris
(74) *Attorney, Agent, or Firm*—Foley & Lardner LLP

(57) ABSTRACT

A superconducting cable according to the present invention includes a former, a superconducting conductor layer formed around the outer circumference of the former, an electric insulating layer formed around the outer circumference of the conductor layer, a shield layer formed around the outer circumferential of the insulating layer, and a normal-conducting metal layer formed between the insulating layer and the shield layer. The normal-conducting metal layer existing inside shield layer has an inductance greater than that of the shield layer, which can suppress a rise in temperature in the event of accidents such as short-circuits, and also can reduce AC losses since currents flow through shield layer during the passage of normal currents.

9 Claims, 1 Drawing Sheet

U.S. PATENT DOCUMENTS

2003/0164246 A1 9/2003 Nassi et al.
2004/0020683 A1* 2/2004 Perez et al. .............. 174/125.1

FOREIGN PATENT DOCUMENTS

| JP | 2000-235816 | 8/2000 |
| JP | 2001-052542 | 2/2001 |
| JP | 2002-008459 | 1/2002 |
| RU | 2 087 956 C1 | 8/1997 |
| RU | 2 099 806 C1 | 12/1997 |
| SU | 1424609 A1 | 9/1990 |
| SU | 1 537 049 A1 | 3/1996 |

OTHER PUBLICATIONS

European Search Report dated Jun. 23, 2008 for related European Patent Application No. 04787783.2-1231.
Decision to Grant and English translation for related Russian patent application number 2005134005/09(038036) dated Apr. 29, 2008.

* cited by examiner

SUPER-CONDUCTIVE CABLE

TECHNICAL FIELD

The present invention relates to a superconducting cable including a former, superconducting layers and an electric insulating layer. More particularly, the present invention relates to a superconducting cable capable of diverting large currents caused by short-circuit accidents and the like to suppress heat generation in superconducting layers and, also, capable of reducing AC losses during the passage of a normal current.

BACKGROUND ART

Conventionally, superconducting cables including superconducting conductors formed from Bi-based high-temperature superconducting wires and the like are known. FIG. 2(A) is a cross-sectional view of a three-core type three-phase superconducting cable including three cable cores, and FIG. 2(B) is a perspective view illustrating an example of the core. A superconducting cable 100 is configured to include cabled three cable cores 102 enclosed within a heat-insulating pipe 101.

Referring to FIG. 2(A) and FIG. 2(B), heat-insulating pipe 101 has a configuration including a double pipe consisting of a corrugated outer pipe 101a and a corrugated inner pipe 101b and a heat-insulating material (not shown) disposed therebetween, the inside of the double pipe being vacuumed. Each cable core 102 includes, in order from the innermost thereof, a former 200, a superconducting conductor 201, an electric insulating layer 202, a shield layer 203, and a flaw-protecting layer 204. Former 200 is formed from a normal-conducting material such as copper or aluminum to be a hollow shape or a solid shape. Superconducting conductor 201 is formed by spirally winding superconducting wires on and around former 200 to be multiple layers. Electric insulating layer 202 is formed by wrapping an insulating material such as semi-synthetic insulating papers. Shield layer 203 is formed by spirally winding superconducting wires similar to superconducting conductor 201 on and around electric insulating layer 202. In normal conditions, there are induced, in shield layer 203, a current with substantially the same magnitude as that of a current flowing through superconducting conductor 201 in the direction opposite thereto. Magnetic fields created by such an induced current can cancel the magnetic fields created by superconducting conductor 201, thereby substantially nullifying magnetic fields leaking from cable core 102 to the outside. Generally, the space 103 defined by inner pipe 101b and respective cable cores 102 forms a refrigerant flow path. Further, on corrugated outer pipe 101a, there is formed a reinforcing layer (protective covering outer sheath) 104 made of polyvinyl chloride and the like.

In the event of accidents such as short-circuits or ground faults in the electric-power system for the superconducting cable, this will induce large currents therein. Therefore, there is a need for taking measures for suppressing fault currents such as the installation of a current-limiting device, because otherwise large currents exceeding steady-state currents will flow through the superconducting cable. For example, when the rated voltage is 350 MV and the rated current is 3 kA, a short-circuit current of about 31.5 kA/will be induced in the event of short-circuit accidents (in an exemplary line, a current of about 31.5 kA will flow for 1 second). When large currents exceeding the critical current value flow through the superconducting conductor, this superconducting conductor will be shifted (quenched) to a normal-conductor, and this shift will induce Joule losses (heat losses). Concurrently, large currents will be induced in the shield layer, which will shift the shield layer to a normal conductor, thus causing Joule losses. Particularly, when significant Joule losses are caused, this may cause burning of the superconductor wires constituting the superconducting conductor or the shield layer or otherwise may suddenly raise the temperature thereof to vaporize refrigerant trapped in voids within the wires, resulting in ballooning (nitrogen ballooning) of the superconducting wires and thus lowering the critical current value. Further, the vaporization of refrigerant may cause dielectric breakdown. In this case, it will require a significantly long time to repair damages caused by such accidents.

Therefore, there have been known techniques for providing a copper layer between the superconducting conductor and the electric insulating layer (see Patent Document 1) or for providing a copper layer on and around the outer circumference of the protective layer (see Patent Document 2), in order to divert currents into the aforementioned metal layers for suppressing heat generation in the superconducting layers, in the event of the occurrence of large currents due to accidents such as short-circuits. Also, Patent Document 3 describes a configuration including multiple shield layers and multiple copper layers provided on the outer circumference of the electric insulating layer, the shield layers being provided between the copper layers.

Patent Document 1: Japanese Laid-Open Patent Publication No. 2000-067663 (see the claims and FIG. 1)

Patent Document 2: Japanese Laid-Open Patent Publication No. 2001-052542 (see the claims and FIG. 1)

Patent Document 3: Japanese Laid-Open Patent Publication No. 2002-008459 (see the claims and FIG. 1)

DISCLOSURE OF THE INVENTION

Problems to be Solved by the Invention

However, the conventional techniques have a drawback of increasing AC losses during the passage of normal currents.

The techniques disclosed in Patent Documents 1 to 3 provide a copper layer for enabling diverting fault currents into the copper layer to protect the superconducting layer in the event of accidents such as short-circuits and also reducing eddy current losses during the passage of normal currents. However, these techniques employ configurations in which the copper layer is provided on the outer circumference of the superconducting layer (the superconducting conductor or the shield layer) formed from superconducting wires, namely configurations in which the copper layer exists outside the superconducting layers. Such configurations have a drawback that currents are prone to flow through the copper layer rather than the superconducting layers during the passage of normal currents, thus resulting in increased AC losses and particularly in increased Joule losses.

In the cable core, a more inner layer out of the superconducting layers and the copper layer has a greater inductance during the passage of normal currents, regardless of accidents such at short circuits. Therefore, with the conventional configurations, the copper layer will have a smaller inductance than that of the superconducting layers. Consequently, during the passage of normal currents, currents will more easily flow through the copper layer, thus resulting in increased Joule losses. Particularly, with the technique disclosed in Patent Document 3, since more copper layers than the superconducting layers are provided and also the copper layers are provided outside the respective superconducting layers, currents flowing through the copper layers will cause significantly large AC losses.

Therefore, it is a main object of the present invention to provide a superconducting cable capable of suppressing temperature rises in the event of accidents such as short-circuits or the like and, also, capable of reducing AC losses during the passage of normal currents.

Means for Solving the Problems

In view of the aforementioned problems, the present inventors have conducted various studies and, as a result, they have found that Joule losses are significantly greater than eddy current losses during the passage of normal currents. Based on the finding, the present invention specifies that a protective layer made of a superconducting metal material is provided on the inner circumference of the superconducting layers, particularly, the inner circumference of the second superconducting layer, in order to reduce Joule losses at the steady states.

Namely, the present invention provides a superconducting cable that includes a former made of a normal-conducting metal, a first superconducting layer formed around the outer circumference of the former, an electric insulating layer formed around the outer circumference of the first superconducting layer, a second superconducting layer formed around the outer circumference of the electric insulating layer, and a normal-conducting metal layer formed between the electric insulating layer and the second superconducting layer.

Hereinafter, the present invention will be described in detail.

The present invention is directed to a superconducting cable including a cable core including, in order from the innermost thereof, a former, a first superconducting layer, an electric insulating layer and a second superconducting layer. Therefore, the superconducting cable may be either a single-phase cable including a single cable core as described above or a multi-phase cable including plural cable cores as described above. Such a multi-phase cable may be, for example, a three-core type three-phase superconducting cable including three twisted cables accommodated within a thermal-insulating tube.

The first superconducting layer may be, for example, a layer of a superconducting conductor and the second superconducting layer may be, for example, a shield layer. For the formation of these superconducting layers, for example, wires made of superconducting materials may be used. The superconducting wires may be, for example, wires fabricated by powder-in-tube processes. For example, the superconducting wires may be wires fabricated by charging powder of Bi-based superconducting raw material, such as Bi2223-based or Bi2212-based superconducting raw material, into metal pipes formed from silver or a silver alloy, then applying a wire drawing process thereto to form wires, binding the resultant wires and then inserting them into a single pipe to form a multi-core wire. Also, the aforementioned superconducting wires may be tape-shaped wires fabricated by further rolling the aforementioned multi-core wires. Namely, the aforementioned superconducting wires may be wires each constituted by a matrix formed from silver or a silver alloy and a superconducting material enclosed in the matrix.

In the event of accidents such as short-circuits, the cable of the present invention diverts fault currents to the former or a normal-conducting metal layer provided on the inner circumference of the second superconducting layer and also diverts the fault currents to the superconducting layers. For example, when the superconducting layers are formed from superconducting wires constituted by the aforementioned matrix and superconducting material, if the superconducting layers are changed from the superconductive state to the normal conductive state due to temperature rises caused by the passage of fault currents therethrough, the superconducting material will be changed to an insulator, thus causing currents to flow through the matrix. In order to suppress heat generation due to the passage of current through the matrix, it is required that the superconducting wires contain a certain amount of silver or silver alloy within the matrix. On the other hand, if the ratio of the matrix in the superconducting wires is increased, the part of the superconducting material of the superconducting wires will be reduced, thereby lowering the critical current density. Therefore, in order to raise the critical current density, the diameter of the superconducting wires must be increased, namely the superconducting cable itself must be made larger. This is, however, undesirable when a compact cable configuration is required. Therefore, in order to realize both suppression of heat generation and reduction of the critical current density in a balanced manner, it is desirable that matrix ratio is within a range between 1.5 or more and 3.0 or less. The term "matrix ratio" refers to the ratio of the cross-sectional area of the matrix to the cross-sectional area of the superconducting material (the cross-sectional area of matrix/the cross-sectional area of superconducting material).

Preferably, the aforementioned superconducting layers are formed by spirally winding such superconducting material wires and may be either a single layer or a multilayer. Preferably, the number of superconducting wires used therein is designed such that the superconducting layers can be maintained at the superconducting state at an operation temperature when a normal current and a maximum current are passed therethrough. When the superconducting layers are formed to be multi-layers, it is desirable that the number of layers therein is designed similarly to the aforementioned setting of the number of wires. Further, when the superconducting layers are formed to be multi-layers, it is desirable that interlayer insulating layers are provided between the respective layers by wrapping kraft papers therebetween, since the provision of such interlayer insulating layers will reduce AC losses. Further, when the superconducting layers are formed to be multi-layers, the winding direction and the winding pitch of the superconducting wires can be adjusted such that the respective layers uniformly share currents to reduce AC losses induced in the superconducting layers.

Further, a characteristic of the present invention is that a protective layer formed from a normal-conducting metal material (normal-conducting metal layer) is provided between the electric insulating layer and the second superconducting layer, namely on the inner side of the second superconducting layer. Further, there is no normal-conducting metal layer for passing currents therethrough, on the outer circumferences of the superconducting layers and, in particular, on the outer circumference of the second superconducting layer. The normal-conducting metal may be a metal having a low electric resistance (copper or aluminum has a resistivity $\rho$ of $2 \times 10^{-7}$ $\Omega \cdot cm$ at 77K) even at temperatures around the temperature of the refrigerant used for the superconducting cable (in the case of using liquid nitrogen as the refrigerant, the temperature of liquid nitrogen). For example, such a normal conductive metal may be copper, aluminum, silver, copper alloys, aluminum alloys or silver alloys. The normal conductive metal layer may be formed by using pipes formed from the aforementioned normal conductive metal material. It is preferable to use tape-shaped wires fabricated by processing the same material into a tape shape or round wires fabricated by applying wire-drawing processes to the same material to form a shape with a round cross-section, since the use of such wires will ease the formation of the normal-conducting metal layer. For example, preferably, wires formed from plural normal-conducting metal materials are wound around the outer circumference of the electrical insulating layer to form a normal-conducting metal layer. It is preferable to use wires formed from normal-conducting metal material for forming the normal-conducting metal layer, since the use of such wires will ease the formation thereof and also may facilitate the penetration of refrigerant through the electric insulating layer, the first superconductive layer and the former provided under the normal-conducting metal layer.

Further, in the case of using a plurality of wires formed from the aforementioned normal-conducting metal material for the formation of a normal-conducting metal layer, it is preferable that each of the wires includes a wire insulating layer around its outer circumference. Currents flowing through the superconducting conductor create magnetic fields, which induce eddy currents in the normal-conducting metal layer. In order to suppress the occurrence of such eddy currents, it is preferable that the outer circumferences of the normal-conducting metal wires are coated with insulating material. The wire insulating layer may be formed, for example, by enamel coating.

Although the aforementioned normal-conducting metal layer may be a single layer, a normal-conducting metal layer configured to be a multi-layer can have an increased cross sectional area, thus being capable of efficiently diverting fault currents. In the case of using wires formed from normal-conducting metal material for the formation of a normal-conducting metal layer, the cross-sectional area of this layer can be arbitrarily adjusted by adjusting the number of the wires therein. Thus, the use of wires is preferable since it eases satisfying requirements, as compared with the use of pipes for forming the same layer. The greater the cross-sectional area of the normal-conducting metal layer, the more largely fault currents can be diverted therethrough. However, a normal-conducting metal layer having an excessively increased cross-sectional area will increase the size of the cable, and therefore, the normal-conducting layer is required to have a cross-sectional area only capable of sufficiently diverting fault currents therethrough.

Further, when the normal-conducting metal layer is formed to be a multi-layer configuration, it is preferable that the respective layers constituting the same metal layer are electrically insulated from one another. By insulating them from one another, it is possible to reduce eddy current losses caused between the respective layers constituting the normal-conducting metal layer. As a method for electrically insulating them from one another, for example, kraft papers, Mylar papers, Kapton (trademark) tapes may be wound to form interlayer insulating layers.

In order to divert fault currents into the normal-conducting metal layer in the event of accidents such as short-circuits, it is necessary that the normal-conducting metal layer is electrically connected to the superconducting layers. In the present invention, the normal-conducting metal layer is provided on the inner side of the second superconducting layer, and therefore it is preferable that it is connected to the second superconducting layer. In this case, if the second superconducting layer and the normal-conducting metal layer are electrically connected to each other throughout the length of the superconducting cable (cable core), currents may flow through the normal-conducting metal layer as well as through the superconducting layers during the passage of normal currents, which may result in increased AC losses. Therefore, it is preferable that the both layers are connected to each other only at the both end portions of the cable, rather than throughout its length. Further, it is preferable that the both layers are electrically insulated from each other at the midsection of the cable in order to suppress increases in the AC loss. More specifically, preferably, an interlayer insulating layer is provided between the second superconducting layer and the normal-conducting metal layer throughout the length of the cable, then portions of the interlayer insulating layer at the both end portions of the cable are removed and then the second superconducting layer and the normal-conducting metal layer are connected to each other through solder. The interlayer insulating layer may be formed, for example, by winding kraft papers, Mylar papers, Kapton (trademark) tapes.

The former provided around the inner circumference of the first superconducting layer may be formed from a normal-conducting metal such as copper or aluminum having a low electric resistance at temperatures near the temperature of the refrigerant used for the superconducting cable. The former may have a hollow-pipe shape, for example. However, since the former will also share fault currents in the event of accidents such as short-circuits, it is preferable that the former has a solid shape having a larger cross-sectional area, in order to facilitate diversion of fault currents into the former. Further, when the former has a solid shape, the cable configuration can be made more compact. Such a solid-shaped former may be formed, for example, by stranding a plurality of normal-conducting metal wires. By stranding a plurality of normal-conducting metal wires, the mechanical strength of the former can be improved. It is preferable that each of the normal-conducting metal wires constituting the former also includes a wire insulating layer around the outer circumference thereof similarly to the normal-conducting metal wires constituting the normal-conducting metal layer, since such a wire insulating layer will reduce eddy current losses. Further, preferably, the stranded normal-conducting metal wires are subjected to compression molding to shape the cross section thereof into a round shape. By the compression molding, the gaps between the respective wires can be reduced, thereby reducing the outer diameter of the former and miniaturizing the cable configuration. Furthermore, by the compression molding, it is possible to reduce concavity and convexity on the outer surface of the former, thus smoothing the outer surface thereof. This prevents the first superconducting layer from being irregularly shaped when it is formed around the outer circumference of the former, thus reducing its influences on the shape of the first superconducting layer.

The electric insulating layer around the outer circumference of the first superconducting layer may be formed, for example, by winding semi-synthetic insulating papers such as PPLP (trademark) or kraft papers. Preferably, the thickness of the electric insulating layer is properly set depending on the applied voltage at the cable lines or the applied impulse voltage. Preferably, a reinforcing layer is provided around the outer circumference of the second superconducting layer. The reinforcing layer may be formed, for example, by wrapping kraft papers or cloth tapes.

Effects of the Invention

With the superconducting cable according to the present invention, there is produced a specific effect that, since the normal-conducting metal layer is provided, large fault currents caused by accidents such as short-circuits are diverted into the normal-conducting metal layer, which can prevent, in the event of accidents, excessive temperature increases in the superconducting layers due to excessive fault currents flowing therethrough or damages due to such temperature increases. Particularly, with the present invention, the aforementioned normal-conducting metal layer is placed inside the super conductive layers, particularly, inside the shield layer, thus making the inductance of the same metal layer larger than that of the superconducting layer. This can suppress currents flowing into the same metal layer, thereby causing currents to hardly flow therethrough during the passage of a normal current. Consequently, the AC loss in the superconducting layers can be reduced.

Further, when round wires with a round cross section or tape-shaped wires formed from normal-conducting metal are used for forming the normal-conducting metal layer, the formation thereof can be made easier and refrigerant can be easily penetrated through the superconducting layer and the former provided under the normal-conducting metal layer. Further, when each of the wires includes a wire insulating layer around the outer circumference of the metal portion, eddy current losses induced in the normal-conducting metal layer can be reduced.

On the other hand, liquid nitrogen is used as refrigerant for a high-temperature superconducting cable and, when cable lines are constructed, the aforementioned liquid nitrogen is circulated through the cable. Therefore, there is provided a system for cooling, using a cooling machine, the refrigerant heated through heat losses in the cooling respective portions of the cable. When the superconducting cable according to the present invention is used in the cable lines equipped with such a system, the cooling machine is required to have only a small cooling capacity, thus reducing the cooling cost and shortening the time required for cooling it to a desired temperature, since heat losses during the passage of a normal current is small as previously described.

DESCRIPTION OF THE REFERENCE SIGNS

1: cable core, 2: former, 3: superconducting conductor, 4: electric insulating layer, 5: normal-conducting metal layer, 6: shield layer, 7: reinforcing layer, 100: three-phase conducting cable, 101: thermal-insulating pipe, 101a: outer pipe, 101b: inner pipe, 102: cable core, 103: hollow space, 104: reinforcing layer, 200: former, 201: superconducting conductor, 202: electric insulating layer, 203: shield layer, 204: flaw protective layer.

BEST MODES FOR CARRYING OUT THE INVENTION

Hereinafter, embodiments of the present invention will be described.

Figure 1:
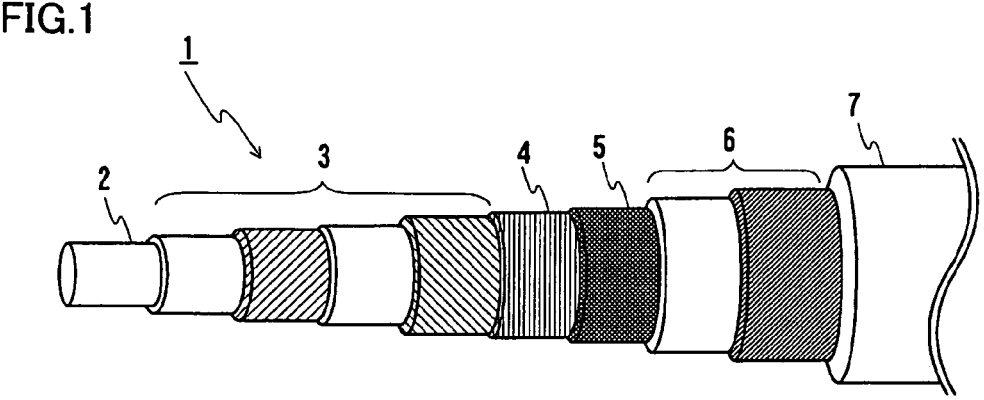
FIG. 1 is a perspective view illustrating general outlines of a cable core of a superconducting cable according to the present invention.

FIG. 1 is a perspective view illustrating general outlines of a cable core of a superconducting cable according to the present invention. A cable core 1 includes, in order from the innermost thereof, a former 2, a superconducting conductor 3, an electric insulating layer 4, a shield layer 6, and a reinforcing layer 7. The present invention has a feature in that a copper layer (normal-conducting metal layer) 5 is provided around the inner circumference of shield layer 6, namely, between electric insulating layer 4 and shield layer 6. Hereinafter, the respective configurations will be described in detail.

(Former)

In the present embodiment, a solid-shaped former was employed as former 2 and the former was formed by twisting a plurality of normal-conducting metal wires and then applying compression molding to them for shaping the cross section thereof into a round shape, wherein each of the aforementioned normal-conducting metal wires included a copper wire and a wire insulating layer formed from an enamel coating on the surface of the copper layer. Since the former has a solid shape, the former has a greater cross-sectional area than that of a hollow-shaped former. Consequently, in the event of the occurrence of large currents due to short-circuits or the like, the large currents can be efficiently diverted into the former and, also, the cable configuration can be miniaturized. Further, since the respective wires are insulated from one another, eddy current losses can be reduced. Further, since the plurality of wires are stranded and then subjected to compression molding, the former has a good mechanical strength and it is easy to form concentric superconducting conductor 3 around the outer circumference of former 2. Further, former 2 is electrically connected to superconducting conductor 3 at the both end portions of cable core 1, which enabled diverting fault currents into former 2 in the event of accidents of short-circuits or the like.

(Superconducting Conductor and Shield Layer)

In the present embodiment, superconducting conductor 3 and shield layer 6 were formed by winding, plural times, superconducting wires fabricated by a power-in-tube process. More specifically, superconducting conductor 3 and shield layer 6 were formed by winding superconducting wires plural times, the superconducting wires being formed from a matrix of silver or a silver alloy and a Bi2233-based superconducting material enclosed within the matrix. Particularly, the superconducting wires used in the present embodiment had a matrix ratio adjusted to be within a range between 1.5 or more and 3.0 or less. Since the matrix ratio satisfies the aforementioned range, it is possible to avoid reduction in the critical current density and suppress heat generation caused by the passage of fault currents diverted into the matrix in the event of the occurrence of transition to the normal-conduction state due to short-circuits or the like.

Superconducting conductor 3 was formed by winding the aforementioned superconducting wires around and on former 2, and shield layer 6 was formed by winding the aforementioned wires around and on copper layer 5. In the present embodiment, superconducting conductor 3 and shield layer 6 were both formed to be a multi-layer structure. More specifically, superconducting conductor 3 was formed to be a four-layer structure and shield layer 6 was formed to be a two-layer structure. Further, interlayer insulating layers were provided between the respective layers constituting superconducting conductor 3 and shield layer 6 by winding kraft papers. Further, the winding direction and winding pitch in the respective layers were adjusted such that the respective layers would substantially uniformly share currents. The above configurations enables efficiently reducing AC losses induced in the superconducting conductor and the shield layer.

(Electric Insulating Layer)

In the present embodiment, electric insulating layer 4 was formed by winding semi-synthetic insulating papers (PPLP (trademark) manufactured by Sumitomo Electric Industries, Ltd.) on and around superconducting conductor 3.

(Copper Layer)

Copper layer 5 is provided inside shield layer 6, namely, between electric insulating layer 4 and shield layer 6, rather than outside electric insulating layer 4, namely, between shield layer 6 and reinforcing layer 7, in order to make the inductance of copper layer 5 larger than that of shield layer 6. With this configuration, it is possible to reduce AC losses during the passage of a normal current and divert fault currents to copper layer 5 and former 2 in the event of short-circuit accidents, to suppress heat losses in superconducting conductor 3 and shield layer 6. In the present embodiment, copper layer 5 was formed by winding, on and around electric insulating layer 4, a copper tape-shaped wire including a wire insulating layer made of an enamel coating on the outer circumference thereof. The use of the tape-shaped wire facilitates penetration of the refrigerant through former 2, superconducting conductor 3 and electric insulating layer 4 placed under copper layer 5. Further, the use of the wire including a wire insulating layer can reduce eddy current losses in copper layer 5 caused by magnetic fields induced by currents flowing through superconducting conductor 3. Further, in the present embodiment, in order to efficiently divert fault currents into copper layer 5 in the event of accidents of short-circuits or the like, copper layer 5 is formed to be a multi-layer structure with a larger cross-sectional area, which is not shown. Between the respective layers constituting copper layer 5, interlayer insulating layers are formed by winding kraft papers, in order to enable reducing eddy current losses induced between the layers.

Also, copper layer 5 may be formed by winding a round wire with a round cross section, and such a wire may include a wire insulating layer formed around the outer circumference thereof. Also, copper layer 5 may have a multi-layer structure and the respective layers constituting the multi-layer structure may be electrically insulated from one another.

Between copper layer 5 and shield layer 6, an interlayer insulating layer is formed by winding kraft papers throughout the length of cable core 1 (not shown). Further, at the both end portions of cable core 1, the interlayer insulating layer provided between copper layer 5 and shield layer 6 is partially removed and shield layer 6 and copper layer 5 are electrically connected to each other through soldier. With this configuration, it is possible to prevent increases in AC losses due to currents flowing through copper layer 5 during the passage of a normal current and divert fault currents into copper layer 5 in the event of accidents of short-circuits or the like.

(Reinforcing Layer)

In the present embodiment, reinforcing layer 7 was formed by winding kraft papers around and on shield layer 6. Further, a protective layer is provided on reinforcing layer 7 by winding cloth tapes therearound.

Figure 2:
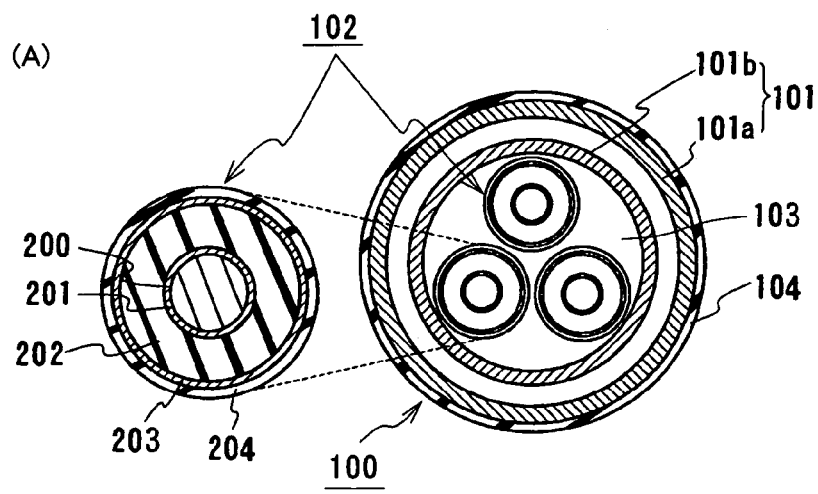
FIG. 2(A) is a cross-sectional view of a three-core type three-phase superconducting cable.
FIG. 2(B) is a perspective view illustrating general outlines of the cable core.
Figure 2:
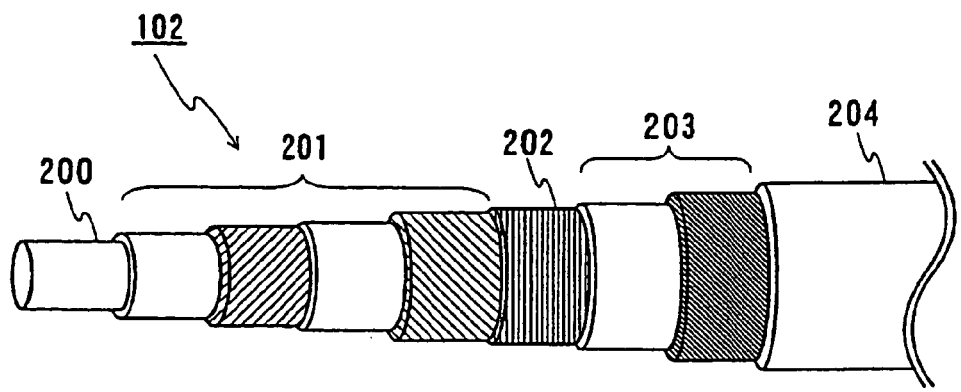

Also, the superconducting cable may be either a single-phase superconducting cable employing a single cable core illustrated in FIG. 1 or a three-phase superconducting cable employing three cores 1 as illustrated in FIG. 2.

(Test Examples)

A three-cores type three-phase superconducting cable, as illustrated in FIG. 2, was fabricated by twisting three cable cores illustrated in FIG. 1, and short-circuit tests were conducted. Hereinafter, there will be described the conditions for fabricating the respective layers in the cable core.
Cable core: the diameter was 41 mm$\phi$
Former: 37 copper wires with a diameter of 2.5 mm$\phi$ were used.
The compression-molded article after compression molding thereof had a diameter of 15.6 mm.
Kraft papers (with a thickness of 0.1 mm) were wound around the outer circumference of the compression-molded article to be three layers to reduce concavity and convexity on the surface thereof (the diameter after the winding of kraft papers was 16.2 mm$\phi$).
Superconducting conductor and Shield layer: Bi2223-based superconducting wires with a matrix ratio of 2.0 were employed.
The number of used wires (in order from the innermost);
Superconducting conductor: 13, 14, 15 and 14
Shield layer: 28 and 29
The pitch of respective layers (in order from the innermost);
Superconducting conductor: 170 mm (Z-winding), 350 mm (Z-winding), 550 mm (S-winding) and 150 mm (S-winding).
Shield layer: 350 mm (Z-winding) and 480 mm (Z-winding)
The thickness of the interlayer insulating layer was 0.15 mm.
Electric insulating layer: the thickness was 7 mm.
Copper layer: tape-shaped wires with a cross-sectional area of 1 mm$^2$ were employed.
Two-layer structure.
The number of used wires (in order from the innermost); 27 and 28
The thickness of the interlayer insulating layer was 0.15 mm.
Refrigerant: liquid nitrogen A current of 31.5 kA was passed through a superconducting cable with the aforementioned configuration for 1 second. As a result, the temperatures of the superconducting conductor and the shield layer were 140 K and 120 K at a maximum, respectively. Then, the temperatures of the superconducting conductor and the shield layer went back to values at which they were before the passage of current and the superconducting conductor and the shield layer were not damaged. Further, the Joule loss during the passage of a normal current (1000 A) was determined. As a result, 3% of the total current flowed through the copper layer and the Joule loss was 0.03 W/m. For comparison, a superconducting cable including a copper layer provided around the outer circumference of the shield layer, instead of around the inner circumference thereof, was fabricated, and the same current was passed therethrough to determine the Joule loss. As a result, 6% of the total current flowed through the copper layer and the Joule loss was 0.13 W/m. Consequently, it was proven that the superconducting cable according to the present invention including a copper layer around the inner circumference of the shield layer could reduce the AC loss during the passage of a normal current.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention can suppress temperature increases in the superconductor layer in the event of faults such as short-circuits. Further, the present invention can reduce AC losses during the passage of normal currents. Consequently, the present invention can be effectively utilized in the fields of electric power supply.

The invention claimed is:
1. A superconducting cable comprising:
a former made of a normal-conducting metal;
a first superconducting layer formed around the outer circumference of said former and in electrical communication with the former;
an electric insulating layer formed around the outer circumference of said first superconducting layer;

a second superconducting layer formed around the outer circumference of said electric insulating layer; and a normal-conducting metal layer is formed between said electric insulating layer and said second superconducting layer; any volume between the first superconducting layer and said electrical insulating layer is free of the normal conducting metal layer; and any volume between the second superconducting layer and an outer layer is free of the normal conducting metal layer; and wherein said first and second superconducting layers are in a state cooled by a refrigerant.

2. The superconducting cable according to claim 1, wherein said normal-conducting metal layer is formed by winding round wires with a round cross section or tape-shaped wires formed from a normal-conducting metal.

3. The superconducting cable according to claim 2, further comprising wire insulating layers around outer circumferences of the wires.

4. The superconducting cable according to claim 1, wherein said superconducting wires have a matrix ratio within a range between 1.5 or more and 3.0 or less.

5. A superconducting cable comprising:

a former made of a normal-conducting metal;

a first superconducting layer formed around the outer circumference of said former and in electrical communication with the former;

an electric insulating layer formed around the outer circumference of said first superconducting layer;

a second superconducting layer formed around the outer circumference of said electric insulating layer;

no more than one normal-conducting metal layer is formed between said electric insulating layer and in contact with said second superconducting layer; and wherein said first and second superconducting layers are in a state cooled by a refrigerant.

6. The superconducting cable of claim 5, wherein said normal-conducting metal layer is in contact with said electric insulating layer.

7. The superconducting cable of claim 5, wherein said normal-conducting metal layer is formed by winding round wires with a round cross section or tape-shaped wires formed from a normal-conducting metal.

8. The superconducting cable according to claim 7, further comprising wire insulating layers around outer circumferences of the wires.

9. The superconducting cable according to claim 5, wherein said superconducting wires have a matrix ratio within a range between 1.5 or more and 3.0 or less.

\* \* \* \* \*